Sept. 3, 1946.  G. W. ASHLOCK, JR  2,406,736
PITTING MACHINE
Filed March 31, 1944  3 Sheets-Sheet 1
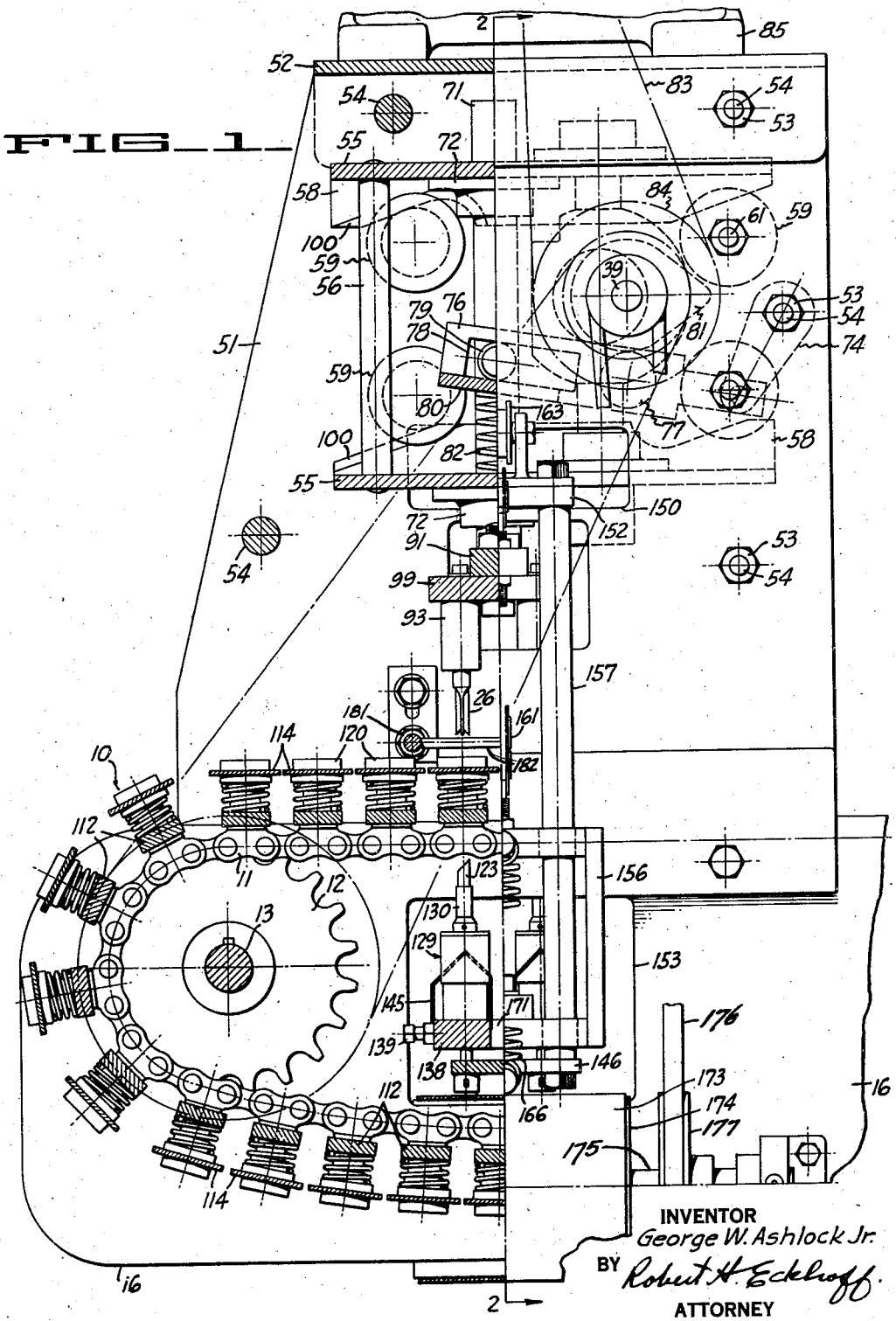
INVENTOR
George W. Ashlock Jr.
BY Robert H. Eckhoff
ATTORNEY Sept. 3, 1946.  G. W. ASHLOCK, JR  2,406,736
PITTING MACHINE
Filed March 31, 1944   3 Sheets-Sheet 2
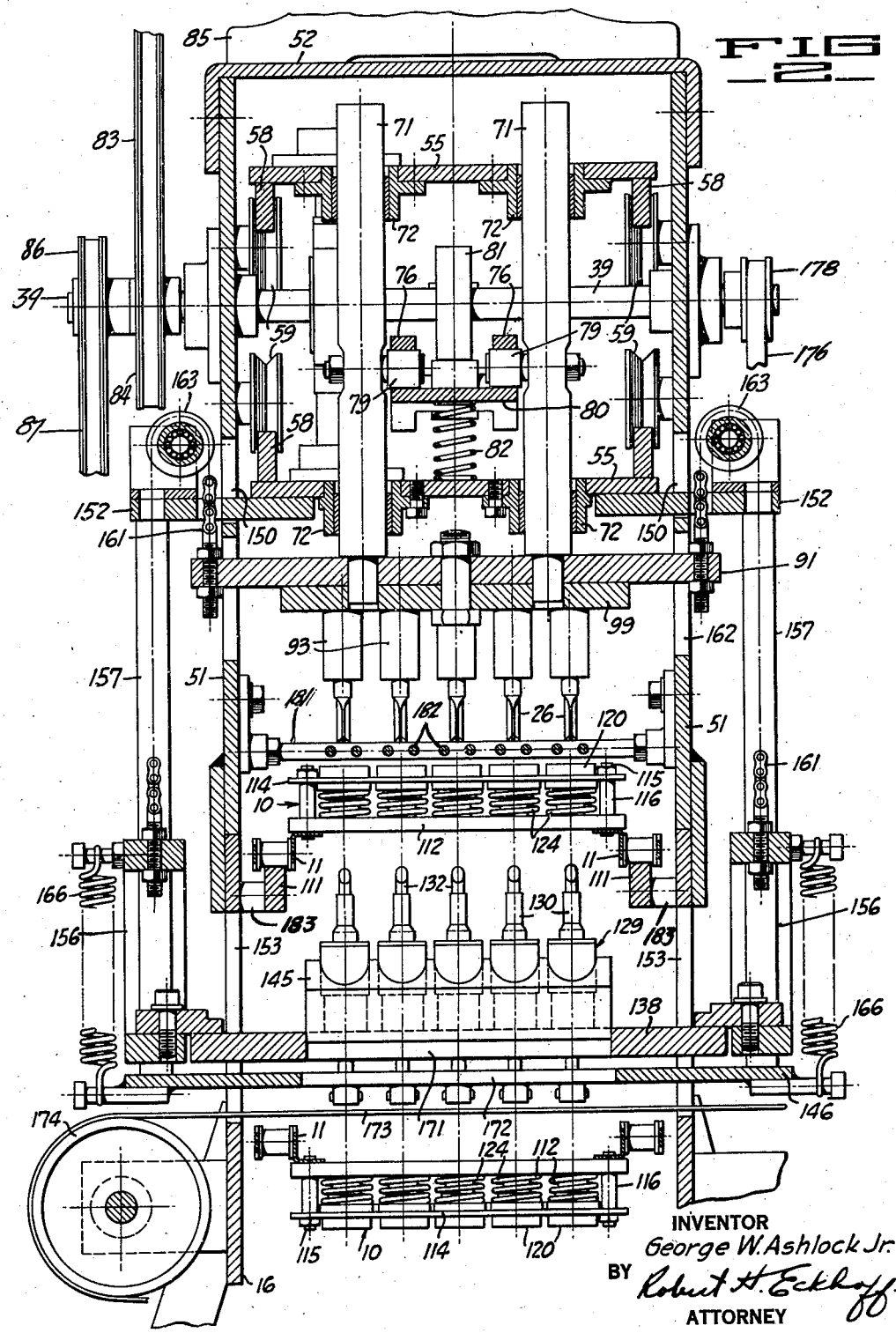
INVENTOR
George W. Ashlock Jr.
BY Robert H. Eckhoff
ATTORNEY Sept. 3, 1946. G. W. ASHLOCK, JR 2,406,736
PITTING MACHINE
Filed March 31, 1944 3 Sheets-Sheet 3
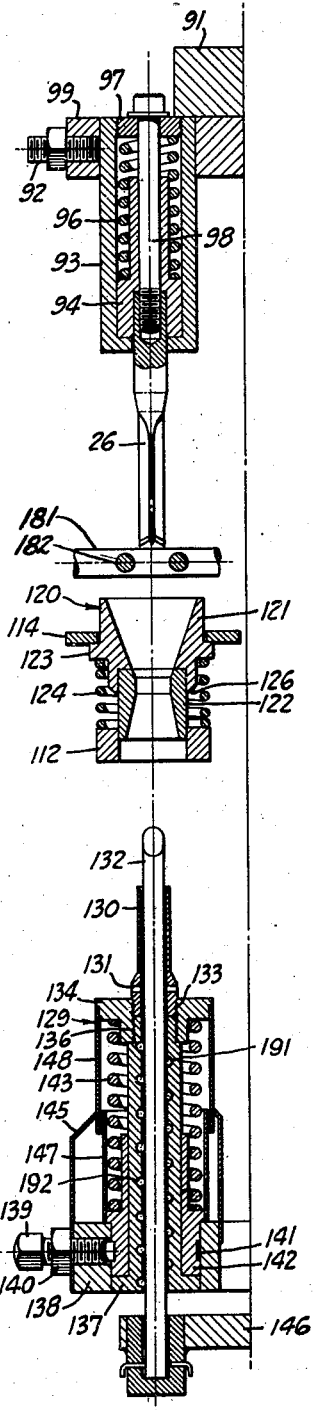
FIG_3_
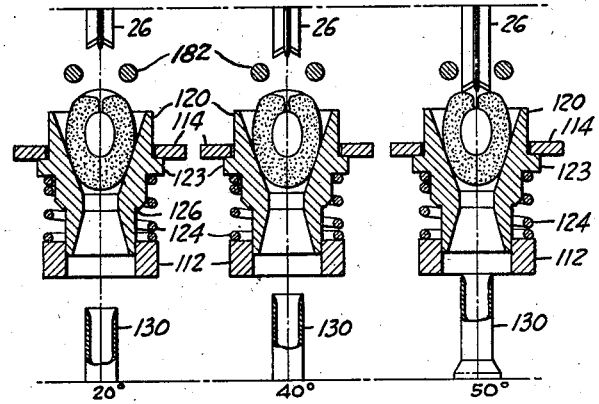
FIG_4_
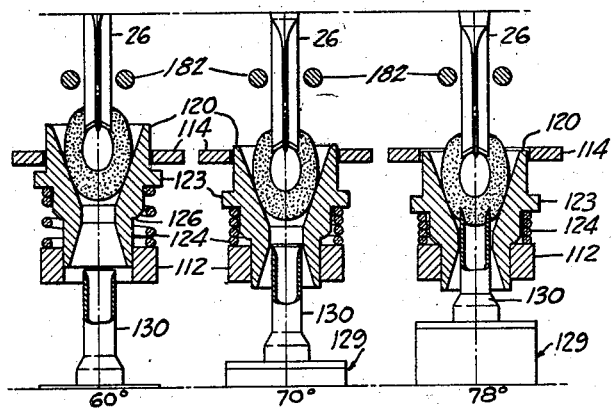
FIG_5_
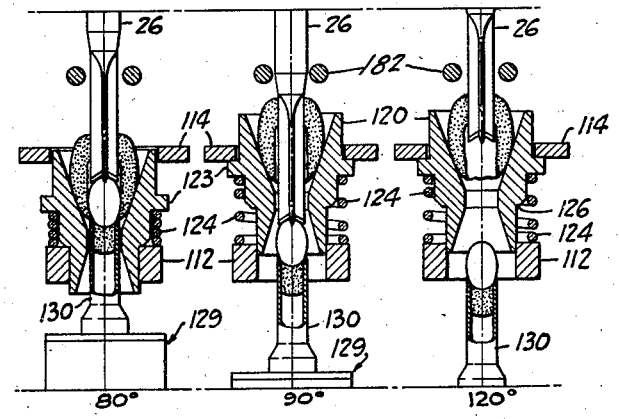
FIG_6_
INVENTOR
George W. Ashlock Jr.
BY Robert H. Eckhoff
ATTORNEY Patented Sept. 3, 1946

2,406,736

UNITED STATES PATENT OFFICE 2,406,736

PITTING MACHINE

George W. Ashlock, Jr., Oakland, Calif.

Application March 31, 1944, Serial No. 528,871

16 Claims. (Cl. 146—27)

This invention relates to fruit pitting machines and particularly to one adapted to the pitting of drupaceous fruits such as olives, plums, prunes, dates and the like. However, it is not limited in application to these, for it can be successfully employed upon any article having a substantially central stone or pit surrounded by an outer flesh portion. The machine of the present invention has proven particularly useful upon olives and it will therefore be described in this connection. However, it is to be understood that the machine may be employed on other like fruits or articles.

In my Patent 2,271,675 of February 3, 1942, I disclosed a machine for continuously and automatically pitting articles of the class described. This machine has met with widespread commercial success. However, referring to that patent and particularly to Figures 2, 3 and 4 thereof, it will be observed that the stone was removed from the fruit along the longitudinal axis of the fruit in conjunction with a portion of the fruit slightly larger than the stone in cross-section. This was achieved by cutting a core in one side of the fruit with a tubular knife, in axial alignment with the stone, then moving the stone and the attached core into the tubular coring knife which is then withdrawn to remove the stone and core. Inasmuch as the stone was passed through the coring knife without crushing or splintering, it was desirable that the knife be of a size slightly larger than the stone to be removed. Now the usual practice is to grade fruit into different sizes and to then handle a fruit of only one or two sizes on a machine. When it was desired to handle other sizes of fruit, it was necessary to change the coring knives. This requires various sets of knives and their substitution for one another. Also the machine must be inoperative during that period of time while the change is being made. Also, because the core cut in the fruit was of a size at least as large as the stone, a fairly sizable opening was made in one side of the fruit. This cut away a considerable portion of the edible fruit.

It is in general the broad object of the present invention to provide a pitting machine of the class described which can be successfully applied to various grades of fruit without changing the coring knives.

Another object of the present invention is to provide a pitting machine which can handle simultaneously several sizes of a fruit.

A further object of the present invention is to provide a novel pitting machine.

A still further object of the invention is to provide a pitting machine of the class described wherein the stone is caused to come to rest upon the cutting edge of the coring knife which serves as a support for the stone, thus enabling a materially smaller core to be cut in the fruit prior to ejection of the stone. This enables a relatively small core to be cut whereby less of the fruit is cut away and lost.

The invention includes other objects and features of advantage, some of which, together with the foregoing, will appear hereinafter wherein the present preferred form of machine embodying this invention is disclosed.

In the drawings accompanying and forming a part hereof, Figure 1 is a side elevation partly in section through a machine embodying the present invention.

Figure 2 is a section taken along the line 2—2 of Figure 1, and illustrating the machine construction in transverse section.

Figure 3 is a side elevation, partly in section, showing the relative position at one point in the operation of the pitting knife, the chuck for supporting the fruit, the coring knife and the pit ejector.

Figures 4, 5 and 6 are a series of views illustrating the relative position of the pitting knife, a fruit positioned in a supporting chuck, and the coring knife during the coring, pitting and stone removing operation.

The machine of the present invention includes a conveyor for delivering the fruit to a pitting station. The fruit is generally delivered to the pitting station in a predetermined position and for this the straightening mechanism as shown in my Patent 2,250,518 of July 29, 1941, may be used advantageously. The conveyor construction employed and its relation to the pitting mechanism is generally shown in that patent and in my previously mentioned Patent 2,271,675. The pitting plunger mechanism is shown particularly in my Patent 2,219,832 of October 29, 1940.

Referring to Patent 2,219,832, and particularly to Figures 1 and 2 in the accompanying drawings herein, a carrier structure, generally indicated at 10, is movable past a presently described pitting mechanism. The machine also includes a suitable frame generally indicated at 16; the structure of the frame and of the carrier structure in relation thereto is fully disclosed in the aforementioned patents. The carrier includes a conveyor chain 11 passing over sprockets 12 supported upon shafts 13 suitably journaled in the frame of the machine at each end thereof.

The pitting mechanism employed is that disclosed in my Patent 2,219,832. This includes opposite parallel vertically extending side members 51 supported on frame 16 and joined together by the member 52 and threaded rods 54 extending through each side member 51 and secured thereto by nut 53. Between the side plates is a pitting knife or plunger head structure which includes horizontal parallel plates 55 secured together in a spaced relation by spacers 56. Each plate 55 carries V-block 58 on opposite sides thereof and having angularly formed V-sections 100 on which roll the V-rollers 59. A stud 61 supports each roller on a side member 51. The V-blocks and V-rollers thus support the head structure provided by plates 55 for a reciprocating movement over the plane of the carrier structure 10 and, at the same time, for an up-and-down movement, so that the head structure moves toward and away from the horizontal plane of the carrier structure 10.

Means are provided on the head structure for operating a pitting or plunger mechanism. This includes the plungers 71 suitably journaled in bearings 72 on plates 55. Fixed arms 74 are mounted upon one of the rods 54 and extend to provide a support for the spaced levers 76 between which is mounted a cam follower 77. The extending end of each lever 76 is slotted as at 78 to engage a roller 79 carried upon each plunger 71. The cam follower 77 is maintained in engagement with a cam 81 carried on shaft 39 by a spring 82 pushing on pad 80 joining the levers 76. The spring urges the levers 76 clockwise in Figure 1 so that the cam follower engages the cam at all times. The shaft 39 is driven by a suitable chain 83 passed over a sprocket 84 to a suitable prime mover 85 mounted on member 52. Another sprocket 86 is provided on shaft 39 and a chain 87 is passed over it and about a sprocket (not shown) on shaft 13 to drive the conveyor.

A plate 91 is mounted upon the extending ends of the plungers 71 and extends transversely across the machine. It carries a plate 99 which supports a plurality of fruit cutting knives or plungers indicated generally at 26. These knives can be arranged in one or more rows across the plate 99 and in the machine illustrated two rows are employed. The construction of the knives is shown in Figure 3.

Each knife is provided as a sub-assembly retained in place in the plate by stud 92 which engages cylinder 93. A plunger 94 carries the knife 26 for a reciprocating movement against the bias of spring 96. A plate 97 is screwed into the end of the cylinder to retain the spring in place and to serve as a guide for the rod 98 which extends through plate 97 and is screwed into the knife 26 to retain it in place, in the plunger 94. A broken knife is quickly replaced by holding knife 26 and rotating the rod 98 to release the knife.

I have previously mentioned that the fruit carrier structure 10 included spaced conveyor chains 11 passed over sprockets 12 at each end of the frame of the machine. Intermediate these sprockets the upper run of the conveyor provides a horizontal conveyor section, the conveyor chains 11 being supported by suitable tracks or supports 111 provided on each side of the frame, as appears in Figure 2. A plurality of supporting plates 112 are mounted between corresponding links in the conveyor chains. A second plate 114 is retained in a spaced relation with respect to plate 112 by studs 115 and spacers 116. Supported for a sliding movement in suitable apertures in each of the plates are a plurality of fruit holders generally indicated at 120.

As appears particularly in Figure 3, each fruit holder comprises two elements, an upper element 121 and a lower or guide element 122. The upper element is preferably formed with a suitable interior configuration enabling the article to be stoned to be positioned in a desired alignment. A suitable configuration is that taught in my Patent 2,250,518 wherein the fruit receiving cavity is formed as an inverted truncated cone with opposite cavity walls substantially at an angle of from 32° to 44°. The upper portion 121 is formed with a shoulder 123 thereon, the upper face engaging the lower side of plate 114 and the lower face serving as a support for a spring 124 which rests upon plate 112 and retains the receptacle against the under side of plate 114 except when it is caused to move downwardly, the spring being compressed until shoulder 126 engages plate 112. The lower or guide portion 122 is suitably joined to portion 121 and is formed with a suitable opening therein to permit entrance of the coring knife and release of the stone and its associated core as will presently appear.

The coring knife structure comprises a sub-assembly 129 including a hollow tubular knife generally indicated at 130 and having a passage 131 adjacent its base to permit the entrance of air so that any solid material in the coring knife can be readily ejected by the ejector 132. The coring knife is threaded as at 133 into a member 134 which is also positioned on threaded end 136 of guide 137.

A plurality of coring knife sub-assemblies are mounted in plate structure 138 which extends across the machine. Each of the coring knife sub-assemblies 129 are retained in apertures in the plate 138 by a stud 139 and lock nut 140, the stud engaging slot 141 in a base or support 142 for the knife assembly. Support 142 also provides a bearing support for guide 137. A spring 143 is positioned between member 134 and support 142 to provide for a resilient mounting of the coring knife. The pit ejector 132 is supported in the base structure generally indicated at 146. Each ejector extends through the pitting knife to eject material in the knife, as will be presently described. Suitable light sheetmetal covers 145, 147 and 148 are provided about each pitting knife assembly to protect it against entrance of foreign material.

The coring knives and pit ejectors are moved by the following structure. The machine side frame plates 51 are suitably apertured as at 150 to pass extension plates 152 secured to the lower plate 55 and which extend to the outside of the machine. Frame members 16 are also apertured as at 153 to permit plate 138 and base 146 to be positioned and to extend across the machine. Two rods 157 are secured on each side of the machine to plates 152. At their lower ends these rods are joined to base 146. Plate 138 is removably mounted in a frame 156 which is mounted for sliding on the rods 157. It will be apparent that the coring knives and the ejectors follow the movement of the pitting head plate 55 and move with this plate at the same rate of advance with the conveyor, since they are formed as an extension on the pitting head plate 55.

To provide for movement of the coring knives, chains 161 are secured to each side of plates 91 and are then passed over guide pulleys 163 and depend downwardly to the coring knife reciprocating frame 156 which is mounted for a reciprocating movement on the guide rods 157. Springs 166, positioned between frame 156 and the base plate 146 place a tension on the chains 161 and ensure that these remain taut.

The pitting plungers and the coring knives are moved by the pitting head over the same path. However, when the knives are lowered by plungers 71, chains 161 raise the coring knives so the two approach each other until they practically meet; in any case they are brought together until the space between them is far less than the length of an olive pit and either one or both of the springs resiliently mounting the plunger and the coring knife is or are compressed. The core ejectors, however, are only moved by the pitting head so the coring knives reciprocate on these and the relative movement thus provided is effective to eject any core retained in the tubular knives.

To permit of ready removal of the ejected stones and associated cores the plates 138 and 146 are each apertured as at 171 and 172, as appears in Figure 2, so that the stones and cores can fall onto suitably driven transverse conveyor belt 173 supported by suitable rollers 174 on each side of the machine, whereby the stones and cores are removed.

One of the rollers is mounted on a shaft 175 on one side of the machine. A V-belt 176 is trained about a pulley 177 on this shaft and a pulley 178 on shaft 39.

To strip any meat adhering to the plungers 26, a stripper is provided made up of rods 181 which extend transversely of the machine and carry stripper plates 182 on each side of a knife.

The operation of the machine will become further apparent upon considering the following sequence of operation, particularly in connection with Figures 3, 4, 5 and 6.

The description will be made as the machine is operated continuously. However, it is to be understood that it can be operated sequentially if desired, that is, instead of moving the pitting, coring mechanisms and the conveyor structure 10 continuously, the conveyor structure 10 can be moved to a pitting and coring position and brought to rest, the stoning, coring and pit-removing mechanisms operated, whereupon the conveyor mechanism is advanced. However, this sequential operation is not nearly so fast and continuous operation is usually greatly preferred.

It being understood that shaft 39 is rotated at a suitable speed, and that conveyor 10 is being operated in a timed relationship therewith, and that each receptacle 120 contains fruit in alignment, the fruit is advanced to the fruit pitting and coring station as appears in Figure 1. It will be noted that below each of the views in Figures 4, 5 and 6 has been placed a degree value. This indicates the relative position of the various parts shown following movement of shaft 39 through the indicated number of degrees from a zero position, that wherein the coring knife and the pitting plunger are practically fully retracted. Referring to these figures, it will be noted that in Figure 4 the pitting plunger and the coring knife are shown approaching the fruit in the receptacle 120 but that the fruit has not been cut by either. In Figure 5, it will be observed that the pitting plunger first engages the fruit after about 60° of rotation of shaft 39, entering the fruit and engaging the stone to compress spring 124 and force the receptacle 120 down until shoulder 126 engages the lower plate 112 to force the fruit into engagement with the coring knife and cut a core in the fruit after about 78° of rotation. The cutting of the core in the particular machine disclosed is effected by movement of the receptacle 120 and movement of the coring knife. This enables the travel of the coring knife and of the receptacle to be kept to a minimum; because the spring 124 regulates the amount of pressure which can be placed upon the fruit it ensures that the portion of the fruit engaged with the sides of the receptacle is not bruised or otherwise harmed.

The coring knife can be made stationary and the plunger can force the fruit and receptacle down to it. However, this involves more travel for the plunger and receptacle.

Referring now to Figure 6, it will be observed that a core has been cut and that the pitting plunger is retaining the stone in engagement on the tubular coring knife. The fruit supported in receptacle 120 is now free to slide along the pitting plunger, but to do this the core and stone must slip through the end of the fruit. This appears in the last view in Figure 6, which illustrates how the pitting plunger and coring knife retract, the latter carrying the stone on its end for subsequent removed by the plunger 132. At the instant that the pit or stone breaks loose, after the core is cut, the bias of spring 124 forces the receptacle and fruit upwardly with a snap. The position of the fruit and receptacle in the 90° view of Figure 6 is attained almost instantaneously after the pit breaks loose.

The views shown cover the period from 20° of movement of the shaft 39 to 120°. The remaining circular movement, that is, from 120° through zero and to 20°, covers the remaining cycle of operation, the only feature of which is the retraction of the coring knife on the pit removing plunger 132 to such an extent that the core and stone are ejected if they happen to be still retained in place under the coring knife. The several views of Figures 4, 5 and 6 are illustrative only and one need not employ the exact timing which I have shown.

From the foregoing I believe it will be apparent that I have provided a machine which in a rapid and continuous manner enables a fruit to be pitted with a minimum flesh removal. In practice I am able to increase by a material extent the quantity of fruit which is secured from the pitting operation. In other words, if one took two like masses of fruit and pitted one mass of the same weight on my previous pitting machine, and pitting an equal mass on the machine of the present invention, the latter mass will exceed the weight of the former mass by several percent, indicating the greater retention in the quantity of the fruit as a result of the pitting operation conducted in accordance with this invention.

In some cases it is desirable to rotate the coring knives as they are raised to cut the core, during coring and retraction. This can be effected by providing a projecting pin 191 on the side of each pit ejector 132, the pin extending into and riding along a spiral cut slot 192 in the member 137 of the coring knife subassembly 129, the stud 139 being in engagement with slot 141 only to an extent sufficient to retain the sub-assembly and permit it to rotate freely in plate 138. If the knives are rotated, a serrated cutting edge is advantageous.

I claim:

1. In combination, a conveyor movable over a path and having a plurality of receptacles to receive fruit, a plunger movably positioned above the conveyor and adapted to be moved to engage and enter a fruit in a receptacle, a coring knife movably positioned below said conveyor and substantially in alignment with said plunger and movable to enter a receptacle through its bottom and cut a core into a fruit to the pit therein, means for first substantially simultaneously moving said plunger and said knife toward each other to retain said fruit in position in the receptacle during cutting of said core by said knife and for forcing said pit into seating engagement on said knife in which position it is retained, said moving means then moving the plunger toward the knife and retracting the knife from the fruit with the pit positioned between the plunger and the knife until the end of the pit engaged by the plunger is free of the fruit, said moving means finally withdrawing the plunger from the fruit, and means for rotating the coring knife during cutting of the core.

2. In a device of the character described, a conveyor having a plurality of open ended fruit holding receptacles thereon for holding fruit in position for pitting; means for moving said conveyor over a path including a pitting station; fruit pitting means comprising a coring knife element movable with respect to said conveyor and adapted to be moved into said receptacle from one end thereof and to be rotated therein to cut a core extending into the pit in a fruit in said receptacle at said station, a plunger element movable with respect to said conveyor and adapted to be moved at said station into the other end of said receptacle, and a resilient mounting for at least one of said elements; and means for moving the knife and plunger toward each other (a) to first engage the plunger with the fruit pit and force the fruit to seat firmly in said receptacle and (b) for thereafter moving said knife with respect to said conveyor and into said receptacle toward said plunger to cut a core in said fruit until the knife substantially abuts and engages the pit and (c) for thereafter moving the plunger and knife toward each other with the pit resting on an end of the knife and an end of the plunger until the resilient mounting is compressed and the pit is firmly held between the knife and plunger and (d) for then moving the knife and plunger simultaneously and in the same direction with respect to the conveyor with the pit held therebetween under the pressure of said compressed resilient mounting means to remove the pit and core from the fruit.

3. In a device of the character described, a conveyor having a plurality of open ended receptacles thereon for holding fruit in position for pitting; means for moving said conveyor over a path including a pitting station; fruit pitting means comprising a coring knife element movable with respect to said conveyor and adapted to be moved into said receptacle from one end thereof to cut a core extending into the pit in a fruit in said receptacle at said station, a plunger element movable with respect to said conveyor and adapted to be moved at said station into the other end of said receptacle, resilient mounting means for each of said elements; and means for moving the knife and plunger toward each other (a) to first engage the plunger with the fruit pit and force the fruit to seat firmly in said receptacle and (b) for thereafter moving said knife with respect to said conveyor and into said receptacle to cut a core in said fruit until the knife abuts and engages the pit and (c) for thereafter moving the plunger and knife toward each other with the pit resting on an end of the knife and an end of the plunger until at least one of the resilient mounting means is compressed and the pit is firmly held between the knife and plunger under the pressure of said compressed mounting means and (d) for then moving the knife and plunger simultaneously and in the same direction with respect to the conveyor with the pit held therebetween under the pressure of said compressed resilient mounting means to remove the pit and core from the fruit.

4. In a device of the character described, a conveyor having a plurality of open ended fruit holding receptacles thereon for holding fruit in position for pitting, each receptacle being reciprocably mounted with respect to said conveyor for movement on said conveyor between a first and a second position, means biasing each receptacle against said movement; means for moving said conveyor over a path including a pitting station; fruit pitting means comprising a coring knife element movable with respect to said conveyor and adapted to be moved into said receptacle from one end thereof to cut a core extending into the pit in a fruit in said receptacle at said station, a plunger element movable with respect to said conveyor and adapted to be moved at said station into the other end of said receptacle; and a resilient mounting for at least one of said elements; and means for moving the knife and plunger toward each other (a) to first engage the plunger with the fruit pit and move the receptacle from the first toward the second position against said bias means and force the fruit to seat firmly in said receptacle and (b) for thereafter moving said knife with respect to said conveyor and into said receptacle toward plunger to cut a core in said fruit until the knife substantially abuts and engages the pit and the bias means can return the receptacle to its first position and the core is broken away from the fruit and the pit is resting on an end of the knife and an end of the plunger and the resilient mounting is compressed and the pit is firmly held between the knife and plunger under the pressure of said compressed mounting and (c) for then moving the knife and plunger simultaneously and in the same direction with respect to the conveyor with the pit held therebetween under the pressure of said compressed resilient mounting means to remove the pit and core from the fruit.

5. In a device of the character described, a conveyor having a plurality of open ended fruit holding receptacles thereon for holding fruit in position for pitting; means for moving said conveyor over a path including a pitting station; fruit pitting means comprising a coring knife element movable with respect to said conveyor and adapted to be moved into said receptacle from one end thereof to cut a core extending into the pit in a fruit in said receptacle at said station, a plunger element movable with respect to said conveyor and adapted to be moved at said station into the other end of said receptacle, and a resilient mounting for at least one of said elements; and means for moving the knife and plunger toward each other until the two substantially meet, in the absence of a fruit and, in the presence of a fruit, the pit is positioned between an end of the knife and an end of the plunger and the resilient mounting is compressed, and for then moving the knife and plunger at substantially the same rate and in the same direction with respect to the conveyor with the pit held therebetween under the pressure of said compressed resilient mounting means to remove the pit and core from the fruit.

6. In a device of the character described, a conveyor having a plurality of open ended receptacles thereon for holding fruit in position for pitting; means for moving said conveyor over a path including a pitting station; fruit pitting means comprising a coring knife element movable with respect to said conveyor and adapted to be moved into said receptacle from one end thereof to cut a core extending into the pit in a fruit in said receptacle at said station, a plunger element movable with respect to said conveyor and adapted to be moved at said station into the other end of said receptacle, resilient mounting means for each of said elements; and means for first moving the knife and plunger toward each other until the pit in a fruit in a receptacle is resting on an end of the knife and an end of the plunger and at least one of the resilient mounting means is compressed and the pit is firmly held between the knife and plunger and for then moving the knife and plunger with the pit held therebetween under the pressure of said compressed resilient mounting means to remove the pit and core from the fruit.

7. In a device of the character described, a conveyor having a plurality of open ended fruit holding receptacles thereon for holding fruit in position for pitting, each receptacle being movable with respect to said conveyor between a first and a second position, means biasing each receptacle against said movement; means for moving said conveyor continuously over a path including a pitting station; fruit pitting means comprising a coring knife element movable with respect to said conveyor and adapted to be moved into said receptacle from one end thereof to cut a core extending into the pit in a fruit in said receptacle at said station, a plunger element movable with respect to said conveyor and adapted to be moved at said station into the other end of said receptacle, and a resilient mounting for at least one of said elements; and means for moving both the knife and plunger toward each other until the pit is retained between an end of the knife and an end of the plunger under the pressure of the compressed resilient mounting and for then moving the knife and plunger with the pit held therebetween under the pressure of said compressed resilient mounting means to remove the pit and core from the fruit.

8. In combination, a conveyor movable over a path and having a plurality of receptacles to receive fruit each receptacle being open at its top and having an opening in its bottom, a resiliently mounted plunger movably positioned above the conveyor and adapted to be moved to engage and enter a fruit in a receptacle, a resiliently mounted coring knife movably positioned below said conveyor and substantially in alignment with said plunger and movable upwardly to enter a receptacle through its bottom opening and cut a core into a fruit to the pit therein, each receptacle being movably mounted on said conveyor, means biasing each receptacle for movement away from said coring knife; and means for moving said plunger and said knife toward each other to retain said fruit in position in the receptacle during cutting of said core by said knife and for forcing said pit into forceful engagement with said knife to compress at least one of the resilient mounts for the knife and plunger, and in which position the fruit is retained and said receptacle is moved against the pressure of said bias means until the pit in the fruit and its attached core break loose from the fruit whereupon the receptacle and fruit are moved along the plunger by said bias means to move the fruit away from the pit and its attached core.

9. In a device for pitting a fruit having a pit having a major and a minor axis, a fruit holding receptacle open at its top and having an opening in its bottom, and adapted to align a fruit with its major axis aligned with the vertical axis of said receptacle and the minor axis transverse to said vertical receptacle axis, a hollow coring knife for cutting a core in the fruit into the pit in the fruit, said knife cutting a core of smaller cross-section than the cross-section of the pit at its minor axis, each receptacle being slidably mounted and biased toward a fruit receiving position, means for engaging fruit in said receptacle to force said receptacle downwardly against said bias until said pit is seated on the knife edge of the coring knife, and means for moving both the knife and the fruit engaging means toward each other to force the pit to seat against the knife until the receptacle is free to move upwardly to carry the pit and its attached core out of the fruit by sliding movement of the fruit along the knife while the pit and its attached core is jammed between the knife and the fruit engaging means.

10. In combination, a conveyor movable over a path and having a plurality of receptacles to receive fruit each receptacle being open at its top and having opening in its bottom, means movably positioned above the conveyor for retaining a fruit centered in a receptacle, a coring knife movably positioned below said conveyor and substantially in alignment with said retaining means and movable to enter a receptacle through its bottom opening and rotatable to cut a core into a fruit to the pit therein, means for first substantially simultaneously moving said retaining means and said knife toward each other to retain said fruit in position in the receptacle during cutting of said core by said knife and for forcing said pit into seating engagement on said knife in which position said pit is retained, said moving means then moving the retaining means toward the knife and simultaneously retracting the knife from the fruit with the pit positioned between the retaining means and the knife until the end of the pit engaged by the plunger is free of the fruit, said moving means finally withdrawing the retaining means from the fruit, and means for rotating the coring knife during cutting of the core.

11. In combination, a conveyor movable continuously over a path and having a plurality of receptacles each adapted to support a fruit having a substantially central pit, a pitting head mounted for a reciprocating movement along said conveyor at a forward rate of advance substantially that of said conveyor, said head including a first portion overlying a portion of the path of said conveyor and a second portion underlying said path portion, a plunger reciprocatively supported by said first portion, a coring knife reciprocatively supported by said second portion, and means for first moving said plunger and said knife substantially simultaneously toward each other during advance of said head and for then moving said plunger and knife in the same direction transverse to said conveyor and at substantially the same rate.

12. In combination, a conveyor movable continuously over a path and having a plurality of receptacles each adapted to support a fruit having a substantially central pit, each receptacle being reciprocatively mounted on said conveyor, means opposing reciprocating movement of each receptacle, a pitting head mounted for a reciprocating movement along said conveyor at a forward rate of advance substantially that of said conveyor, said head including a first portion overlying a portion of the path of said conveyor and a second portion underlying said path portion, a plunger reciprocatively supported by said first portion, a coring knife reciprocatively supported by said second portion, and means for first moving said plunger and said knife substantially simultaneously toward each other during advance of said head and for then moving said plunger and knife in the same direction transverse to said conveyor and at substantially the same rate.

13. In combination, a conveyor movable continuously over a path and having a plurality of receptacles to receive fruit, a plunger urged into an operative position by a spring bias and movably positioned above the conveyor and adapted to be moved to engage and enter a fruit in a receptacle during continuous advance of the conveyor, a coring knife urged into an operative position by a spring bias and movably positioned below said conveyor and substantially in alignment with said plunger and movable to enter a receptacle through its bottom and cut a core into a fruit to the pit therein during continuous conveyor advance, each receptacle being individually movably mounted on said conveyor and biased away from said coring knife, and means for first substantially simultaneously moving said plunger and said knife with said conveyor as it moves along said path and toward each other to retain said fruit in position in the receptacle during cutting of said core by said knife and for forcing said pit into seating engagement on said knife in which position it is retained and said receptacle is moved against said bias until the pit in the fruit breaks loose from the fruit, whereupon the receptacle and fruit move along the plunger, said moving means then moving the knife and plunger at substantially the same rate and in the same direction, said moving means finally moving said knife and said plunger away from each other.

14. In a device of the character described, a conveyor having a plurality of open ended fruit holding receptacles thereon for holding fruit in position for pitting; means for moving said conveyor over a path including a pitting station; fruit pitting means comprising a coring knife element movable with respect to said conveyor and adapted to be moved into said receptacle from one end thereof and to be rotated therein to cut a core extending into the pit in a fruit in said receptacle at said station, a plunger element movable with respect to said conveyor and adapted to be moved at said station into the other end of said receptacle, and a resilient mounting for at least one of said elements; means for moving the knife and plunger toward each other (a) to first engage the plunger with the fruit pit and force the fruit to seat firmly in said receptacle and (b) for thereafter moving said knife with respect to said conveyor and into said receptacle toward said plunger to cut a core in said fruit until the knife substantially abuts and engages the pit and (c) for thereafter moving the plunger and knife toward each other with the pit resting on an end of the knife and an end of the plunger until the resilient mounting is compressed and the pit is firmly held between the knife and plunger and (d) for then moving the knife and plunger simultaneously and in the same direction with respect to the conveyor with the pit held therebetween under the pressure of said compressed resilient mounting means to remove the pit and core from the fruit; and means for rotating the coring knife during its advance in contact with the fruit.

15. In a device of the character described, a conveyor having a plurality of open ended fruit holding receptacles thereon for holding fruit in position for pitting; means for moving said conveyor over a path including a pitting station; fruit pitting means comprising a coring knife element movable with respect to said conveyor and adapted to be rotated and moved into said receptacle from one end thereof to cut a core extending into the pit in a fruit in said receptacle at said station, a plunger element movable with respect to said conveyor and adapted to be moved at said station into the other end of said receptacle, and a resilient mounting for at least one of said elements; means for moving the knife and plunger toward each other until the two substantialy meet, in the absence of a fruit and, in the presence of a fruit, the pit is positioned between an end of the knife and an end of the plunger and the resilient mounting is compressed and for then moving the knife and plunger at substantially the same rate and in the same direction with respect to the conveyor with the pit held therebetween under the pressure of said compressed resilient mounting means to remove the pit and core from the fruit; and means for rotating the coring knife during core cutting.

16. In a device for pitting a fruit having a pit having a major and a minor axis, a fruit holding receptacle open at its top and having an opening in its bottom, and adapted to align a fruit with its major axis aligned with the vertical axis of said receptacle and the minor axis transverse to said vertical receptacle axis, a hollow coring knife rotatably mounted for cutting a core in the fruit into the pit in the fruit, said knife cutting a core of smaller cross-section than the cross-section of the pit at its minor axis, each receptacle being slidably mounted and biased toward a fruit receiving position, means for engaging fruit in said receptacle to force said receptacle downwardly against said bias until said pit is seated on the knife edge of the coring knife, means for rotating the knife during core cutting, and means for moving both the knife and the fruit engaging means toward each other to force the pit to seat against the knife until the receptacle is free to move upwardly to carry the pit and its attached core out of the fruit by sliding movement of the fruit along the knife while the pit and its attached core is jammed between the knife and the fruit engaging means.

GEORGE W. ASHLOCK, Jr.